(12) United States Patent
Ye et al.

(10) Patent No.: US 12,368,621 B2
(45) Date of Patent: Jul. 22, 2025

(54) TECHNOLOGIES FOR REFERENCE SIGNAL INDICATION

(71) Applicant: Apple Inc., Cupertino, CA (US)

(72) Inventors: Sigen Ye, San Diego, CA (US); Huaning Niu, San Jose, CA (US); Hongbo Yan, Vista, CA (US); Shengshan Cui, San Diego, CA (US); Wei Zeng, Saratoga, CA (US); Oghenekome Oteri, San Diego, CA (US); Weidong Yang, San Diego, CA (US); Dawei Zhang, Saratoga, CA (US); Hong He, San Jose, CA (US); Haitong Sun, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/260,777

(22) PCT Filed: Dec. 20, 2021

(86) PCT No.: PCT/US2021/064321
§ 371 (c)(1),
(2) Date: Jul. 7, 2023

(87) PCT Pub. No.: WO2022/154940
PCT Pub. Date: Jul. 21, 2022

(65) Prior Publication Data
US 2024/0064048 A1 Feb. 22, 2024

Related U.S. Application Data

(60) Provisional application No. 63/136,954, filed on Jan. 13, 2021.

(51) Int. Cl.
*H04L 27/26* (2006.01)
*H04L 5/00* (2006.01)
*H04W 68/00* (2009.01)

(52) U.S. Cl.
CPC .......... *H04L 27/261* (2013.01); *H04L 5/0048* (2013.01); *H04W 68/005* (2013.01)

(58) Field of Classification Search
CPC ... H04W 68/005; H04L 5/0048; H04L 27/261
See application file for complete search history.

(56) References Cited

U.S. PATENT DOCUMENTS

2024/0039669 A1* 2/2024 Koskela ................ H04L 5/0051

FOREIGN PATENT DOCUMENTS

WO 2019029711 A1 2/2019

OTHER PUBLICATIONS

International Patent Application No. PCT/US2021/064321, International Preliminary Report on Patentability, Jul. 27, 2023, 12 pages.

(Continued)

*Primary Examiner* — Rahel Guarino
(74) *Attorney, Agent, or Firm* — Kilpatrick Townsend & Stockton LLP

(57) ABSTRACT

The present application relates to devices and components including apparatus, systems, and methods for reference signal indication for idle or inactive user equipments.

14 Claims, 11 Drawing Sheets

800

Determining that TRS/CSI-RS is to be transmitted at one or more configured occasions
804

Identifying the one or more configured occasions based on predetermined number, predetermined time duration, or time offset
808

Attempting to detect the TRS/CSI-RS in at least one of the one or more configured occasions
812

(56) References Cited

OTHER PUBLICATIONS

"Indication of TRS/CSI-RS for Idle/Inactive-Mode UE Power Saving," 3GPP TSG RAN WG1 #103-e, R1-2008475, Apple Inc., Available Online at: https://ftp.3gpp.org/tsg_ran/WG1_RL1/TSGR1_103-e/Docs/R1-2008475.zip R1-2008475Apple_TRS for UE PS.docx, Nov. 13, 2020, 8 pages.

"Moderator Summary for TRS/CSI-RS Occasion(s) for Idle/Inactive UEs," Available Online at: https://ftp.3gpp.org/tsg_ran/WG1_RL1/TSGR1_103-e/Docs/R1-2008178.zip R1-2008178, Moderator (Samsung), 3GPP TSG RAN WG1 #103-e R1-2008178, Nov. 13, 2020, 51 pages.

"Provision of TRS/CSI-RS for Idle/Inactive UEs," Available Online at: URL:https://ftp.3gpp.org/tsg_ran/WG1_RL1/TSGR1_103-e/Docs/R1-2009106.zipR1-2009106.docx, Lenovo, Motorola Mobility, 3GPP TSG RAN WG1 Meeting #103-e R1-2009106, Nov. 13, 2020, 6 pages.

"TRS/CSI-RS for Idle/Inactive UE Power Saving," Available Online at: https://ftp.3gpp.org/tsg_ran/WG1_RL1/TSGR1_103-e/Docs/R1-2009267.zip R1-2009267, Qualcomm Incorporated, 3GPP TSG-RAN WG1 #103-e, R1-2009267, Nov. 13, 2020, 6 pages.

International Patent Application No. PCT/US2021/064321, International Search Report and Written Opinion, Apr. 12, 2022, 17 pages.

3rd Generation Partnership Project; Technical Specification Group Radio Access Network; NR; Physical channels and modulation (Release 16), 3GPP TS 38.211 V16.4.0, Dec. 2020, 133 pages.

3rd Generation Partnership Project; Technical Specification Group Radio Access Network; NR; Radio Resource Control (RRC) protocol specification (Release 16), 3GPP TS 38.331 V16.3.1, Jan. 2021, 932 pages.

3rd Generation Partnership Project; Technical Specification Group Radio Access Network; NR; Multiplexing and channel coding (Release 16), 3GPP TS 38.212 V16.4.0, Dec. 2020, 152 pages.

"New WI: UE Power Saving Enhancements," MediaTek Inc., 3GPP TSG RAN meeting #88e, RP-200938, Jun. 29-Jul. 3, 2020, 5 pages.

* cited by examiner

TECHNOLOGIES FOR REFERENCE SIGNAL INDICATION

CROSS-REFERENCE TO RELATED APPLICATION

This application is a 371 U.S. National Phase of PCT International Patent Application No. PCT/US2021/064321, filed Dec. 20, 2021, which claims the benefit of U.S. Provisional Application No. 63/136,954, filed Jan. 13, 2021, which are hereby incorporated by reference in their entirety for all purposes

BACKGROUND

Third Generation Partnership Project (3GPP) has ongoing work items related to power saving enhancements. Consideration of system performance aspects with respect to power saving enhancements for user equipments (UEs) in idle and inactive mode is needed.

DETAILED DESCRIPTION

Figure 1:
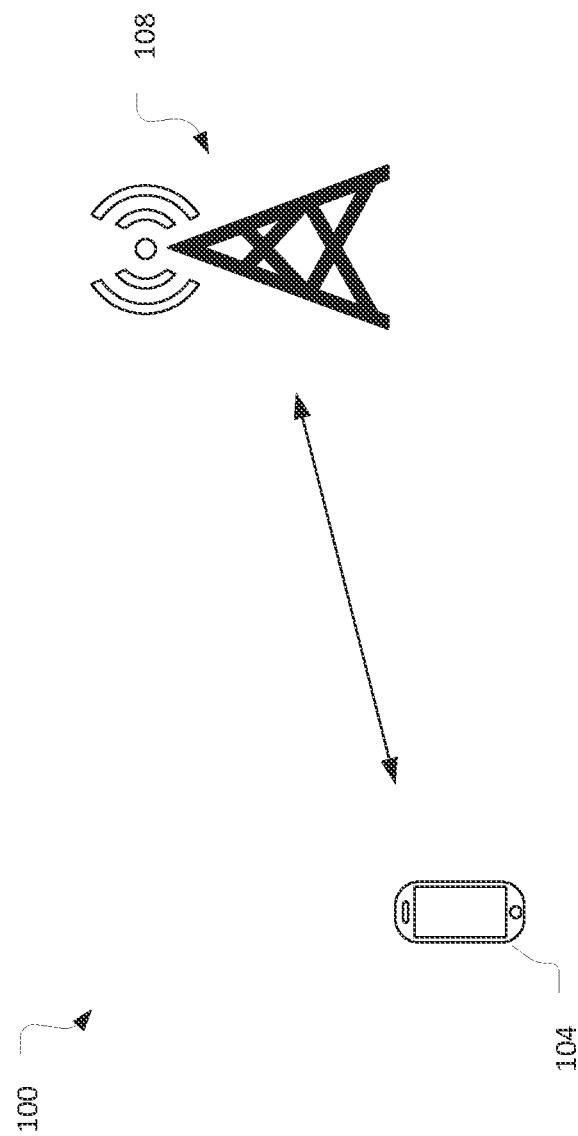
FIG. 1 illustrates a network environment in accordance with some aspects.

The following detailed description refers to the accompanying drawings. The same reference numbers may be used in different drawings to identify the same or similar elements. In the following description, for purposes of explanation and not limitation, specific details are set forth, such as particular structures, architectures, interfaces, techniques, etc. in order to provide a thorough understanding of the various aspects. However, it will be apparent to those skilled in the art having the benefit of the present disclosure that the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces; for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects, or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some aspects. The network environment 100 may include a UE 104 and a base station 108. The base station 108 may provide a wireless access cell through which the UE 104 may communicate with the base station 108. In some aspects, the base station 108 is a gNB that provides 3GPP New Radio (NR) cell. The air interfaces over which the UE 104 and base station 108 communicate may be compatible with 3GPP technical specifications (TSs), such as those that define Fifth Generation (5G) NR system standards.

The base station 108 may use a physical downlink control channel (PDCCH) to transmit downlink control information (DCI) to the UE 104. The DCI may provide uplink resource allocations on a physical uplink shared channel (PUSCH), downlink resource allocations on a physical downlink shared channel (PDSCH), and various other control information as will be described.

The PDSCH may be used to transfer application data, signaling radio bearer (SRB) messages, system information, and paging messages.

The UE 104 may include radio resource control (RRC) state machines that perform operations related to a variety of RRC procedures including, for example, paging, RRC connection establishment, RRC connection reconfiguration, and RRC connection release. The RRC state machine may be implemented by protocol processing circuitry; see, for example, baseband circuitry 1004A of FIG. 10.

The RRC state machine may transition a UE into one of a number of RRC states (or "modes") including, for example, a connected state (RRC connected), an inactive state (RRC inactive), and an idle state (RRC idle). A UE may start in RRC idle when it first camps on a 5G cell, which may be after the UE is switched on or after an inter-system cell reselection from a Long Term Evolution (LTE) cell. To engage in active communications, the RRC state machine may transition the UE from RRC idle to RRC connected by performing an RRC setup procedure to establish a logical connection; for example, an RRC connection, with the base station 108. In RRC connected, the UE may be configured with at least one SRB for signaling (for example, control messages) with the base station; and one or more data radio bearers (DRBs) for data transmission. When the UE is less actively engaged in network communications, the RRC state machine may transition the UE from RRC connected to RRC inactive using an RRC release procedure. The RRC inactive state may allow the UE 104 to reduce power consumption as compared to RRC connected, but will still allow the UE 104 to quickly transition back to RRC connected to transfer application data or signaling messages.

While in RRC idle state, the UE 104 may scan for synchronization signals transmitted by the base station 108 before decoding system information. The system information may provide parameters used to access the cell and to receive paging messages. The system information may be broadcast by the base station 108 in a master information block (MIB) within a physical broadcast channel (PBCH) and system information blocks (SIBs) in the PDSCH. The synchronization signals and the PBCH may be transmitted in SS/PBCH blocks (SSBs).

The UE 104 may use the synchronization signals for relatively coarse synchronization and may, thereafter, use a tracking reference signal (TRS) transmitted by the base station 108 to track time and frequency variations with a high resolution. The TRS may be a channel state information-reference signal (CSI-RS) resource set with a specific configuration designed for tracking performance. The CSI-RS resource set may be configured with a trs-Info flag set to "true" to indicate the resource that is to be used for TRS.

The UE 104, while in idle or inactive, may receive configuration of TRS/CSI-RS occasions from SIB signaling. Higher-layer signaling methods, for example, dedicated RRC, RRC release message, etc., may, in some instances, provide additional configuration information.

TRS/CSI-RS transmissions may not always be transmitted by the base station 108 in configured occasions. Thus, providing information regarding potential TRS/CSI-RS occasions to idle/inactive mode UEs may facilitate power saving. The provision of this information may be done in a manner to reduce impacts on system overhead.

In some instances, the TRS/CSI-RS may be conditionally available at the configured occasions. The condition upon which the TRS/CSI-RS are available may be the existence of a paging message. For example, if the base station 108 transmits a paging message, it will also transmit a TRS/CSI-RS. The conditional availability of the TRS/CSI-RS at the configured occasions may be informed to the UE as described herein.

Figure 2:
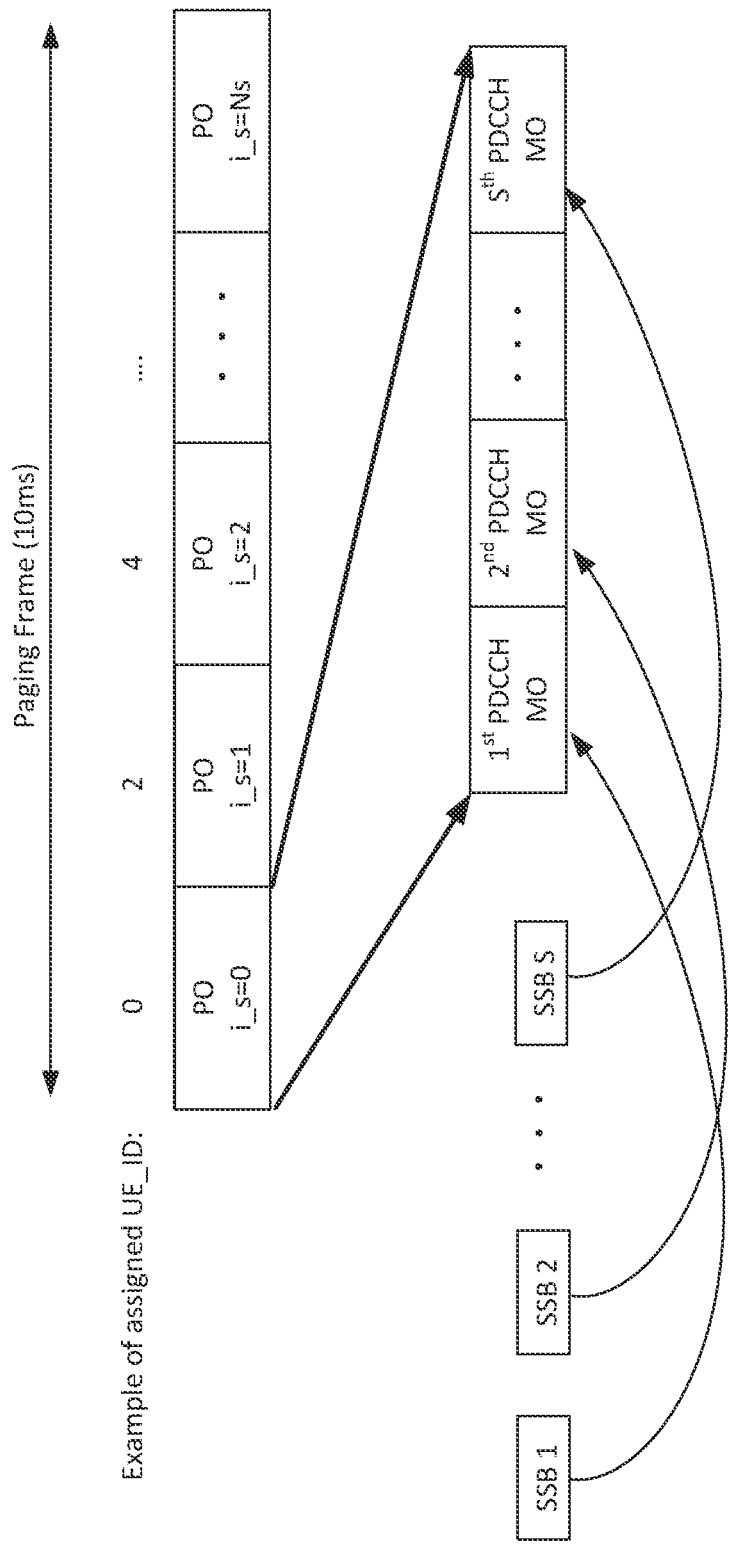
FIG. 2 illustrates a signaling diagram in accordance with some aspects.

FIG. 2 illustrates a signaling diagram 200 in accordance with some aspects of this disclosure. The signaling diagram 200 includes a plurality of SSBs (SSB 1-SSB S). The number of SSBs transmitted, e.g., S, may be determined based on the ssb-PositionsInBurst parameter transmitted in SIB1.

Each of the SSBs may correspond to a PDCCH monitoring occasion. For example, a $k^{th}$ PDCCH monitoring occasion corresponds to a $k^{th}$ SSB. The correspondence between the SSB and the PDCCH monitoring occasion may imply that a same transmit beam is used to transmit the SSB and a PDCCH in the corresponding PDCCH monitoring occasion.

The paging occasion (PO) may be a set of S consecutive PDCCH monitoring occasions. A PO may include a plurality of slots.

The PDCCH monitoring occasions for paging that do not overlap with uplink symbols (determined according to tdd-UL-DL-ConfigurationCommon) may be sequentially numbered from zero starting from the first PDCCH monitoring occasion for paging in the paging frame (PF), which may be 10 milliseconds (ms).

When the UE 104 is in RRC idle or inactive, it may monitor one paging occasion (PO) per discontinuous reception (DRX) cycle. The UE 104 may determine the PO, and the PF that includes the PO, based on parameters broadcast using a paging control channel (PCCH) configuration (PCCH-config) parameter within the SIB1.

As discussed above, if the base station 108 is to transmit a paging PDCCH/PDSCH within a paging occasion, it may also be required to transmit a TRS/CSI-RS in one or more configured occasions before the paging occasion. Thus, from the network perspective, if there is a paging PDCCH/PDSCH in a PO, the configured TRS/CSI-RS is to be transmitted. If there is no paging PDCCH/PDSCH in a PO, the configured TRS/CSI-RS may or may not be transmitted.

The UE 104 may have different options for handling a TRS/CSI-RS. In a first option, the UE 104 may always wake up one SSB in advance regardless of a signal-to-interference and noise (SINR) condition. In a second option, the UE 104 may perform a blind detection for TRS/CSI-RS in the configured occasions before the paging occasion. If the UE 104 detects the TRS/CSI-RS, the UE 104 may perform finer time/frequency tracking based on the TRS/CSI-RS. If the UE 104 does not detect the TRS/CSI-RS, it may not perform any further operation.

In some instances, regardless of whether the UE 104 detects the TRS/CSI-RS, the UE 104 may continue to do regular PO detection. If there is a paging PDCCH/PDSCH, the UE 104 may have achieved sufficient synchronization accuracy from the SSB for the decoding. If there is no paging PDCCH/PDSCH, whether the UE 104 achieves sufficient synchronization accuracy may be inconsequential because there is no message to decode.

Aspects of the present disclosure describe how the base station 108 may signal the conditional availability of the TRS/CSI-RS in the configured occasions, the conditions for transmitting the TRS/CSI-RS in the configured occasions, and various enhancements to the beam-based operation(s).

Four options are described for signaling the conditional availability of the configured TRS/CSI-RS occasions. These options are not mutually exclusive. Aspects of some of these options may be combined with others of these options.

In a first option, the base station 108 may provide signaling in a SIB to indicate whether the TRS/CSI-RS is conditionally available. The signaling may be explicit or implicit.

Implicit signaling may be based on information in the SIB that configures the TRS/CSI-RS for transmission in a configured occasion. Receipt of the configuration may implicitly indicate that the TRS/CSI-RS occasions are conditionally available.

Explicit signaling may be based on a specific indicator in the SIB. For example, one or more bits may be provided to indicate whether the configured TRS/CSI-RS occasions are conditionally available.

In a second option, the base station 108 may signal whether the TRS/CSI-RS is conditionally available in a paging PDCCH. The indication may become effective after a predetermined time. The predetermined time may be predefined, for example, in a 3GPP Technical Specification (TS), or derived from a parameter configured to the UE 104 by the base station 108. For one example, the indication may become effective in a following PO.

In a third option, the base station 108 may signal whether the TRS/CSI-RS is conditionally available in a paging PDSCH. The indication may become effective after a predetermined time. The predetermined time may be predefined, for example, in a 3GPP TS, or derived from a parameter configured to the UE 104 by the base station 108. For one example, the indication may become effective in a following PO.

In a fourth option, the base station 108 may signal whether the TRS/CSI-RS is conditionally available with a paging early indication. For example, the indication of whether TRS/CSI-RS is conditionally available may be transmitted in the PDCCH transmission that includes the paging early indication, which may be used to provide the UE 104 with an advance indication of whether there is an upcoming paging message for the UE.

In various aspects, two conditions may be used as the basis for the conditional availability of the TRS/CSI-RS occasions in the paging occasion. A first condition may be the presence of a paging PDCCH in the paging occasion. A second condition may be the presence of a paging PDSCH in the paging occasion.

In the first condition, the configured TRS/CSI-RS may be required to be transmitted in occasions before the paging occasion if there is a paging PDCCH in the paging occasion. In some instances, a paging PDCCH may schedule a paging PDSCH. In other instances, the paging PDCCH may be transmitted without a paging PDSCH. This may occur when the paging PDCCH provides system information update, emergency notification, etc. In some instances, the availability of the TRS/CSI-RS may be conditioned on the presence of the paging PDCCH, regardless of whether there is an accompanying paging PDSCH.

In the second condition, the configured TRS/CSI-RS may be required to be transmitted in occasions before the paging occasion if there is a paging PDSCH in the paging occasion. Thus, in this situation, a configured TRS/CSI-RS may not be required to be transmitted if there is a paging PDCCH that is not accompanied by a paging PDSCH. This condition may be based on the assumption that even without the TRS/CSI-RS, the UE 104 may still have sufficient time/frequency synchronization accuracy to decode a PDCCH. Simulation results indicate that the PDCCH is much less sensitive to frequency offset compared to the PDSCH. Thus, the UE 104 may not need the additional time/frequency synchronization provided by the TRS/CSI-RS unless there is an accompanying paging PDSCH.

In the event that the configured TRS/CSI-RS occasions arm not required to be transmitted (for example, there is no paging PDCCH or PDSCH), the base station 108 may have the freedom to transmit or not transmit the configured TRS/CSI-RS occasions.

The UE 104 may perform a blind detection to determine whether a TRS/CSI-RS is present. If the UE 104 detects the TRS/CSI-RS, it may use it for time/frequency tracking or any other purpose. If the TRS/CSI-RS is detected before paging occasion, the UE may continue with the paging occasion reception. If the TRS/CSI-RS is not detected before paging occasion, the UE may or may not perform the paging occasion reception.

If the UE 104 does not detect the TRS/CSI-RS before a paging occasion, it may choose to not perform the paging occasion reception in order to increase UE power savings. However, in some situations, the UE 104 may miss the page in the event that there was a TRS/CSI-RS transmitted but simply not successfully detected by the UE 104.

If the UE 104 does not detect the TRS/CSI-RS before the paging occasion, it may also choose to perform the paging occasion reception. This may consume UE power unnecessarily when the TRS/CSI-RS detection result is correct (for example, no TRS/CSI-RS was transmitted), but may provide more robustness against a missed detection of the TRS/CSI-RS.

Whether the UE performs the paging occasion reception, in the event no TRS/CSI-RS is detected, may either by specified (by a 3GPP TS, for example), configured (by the base station 108), or up to UE implementation. A TRS/CSI-RS configuration indicates periodic resources, typically defined by a period and an offset. Given that the TRS/CSI-RS occasions are required to be transmitted when there is a paging PDCCH/PDSCH, a clear definition of the transmitted TRS/CSI-RS occasions is desired. FIGS. 3-6 illustrate signaling diagrams to describe the determination of which TRS/CSI-RS occasions are to be transmitted when there is a paging PDCCH/PDSCH in accordance with some aspects of this disclosure.

Figure 3:
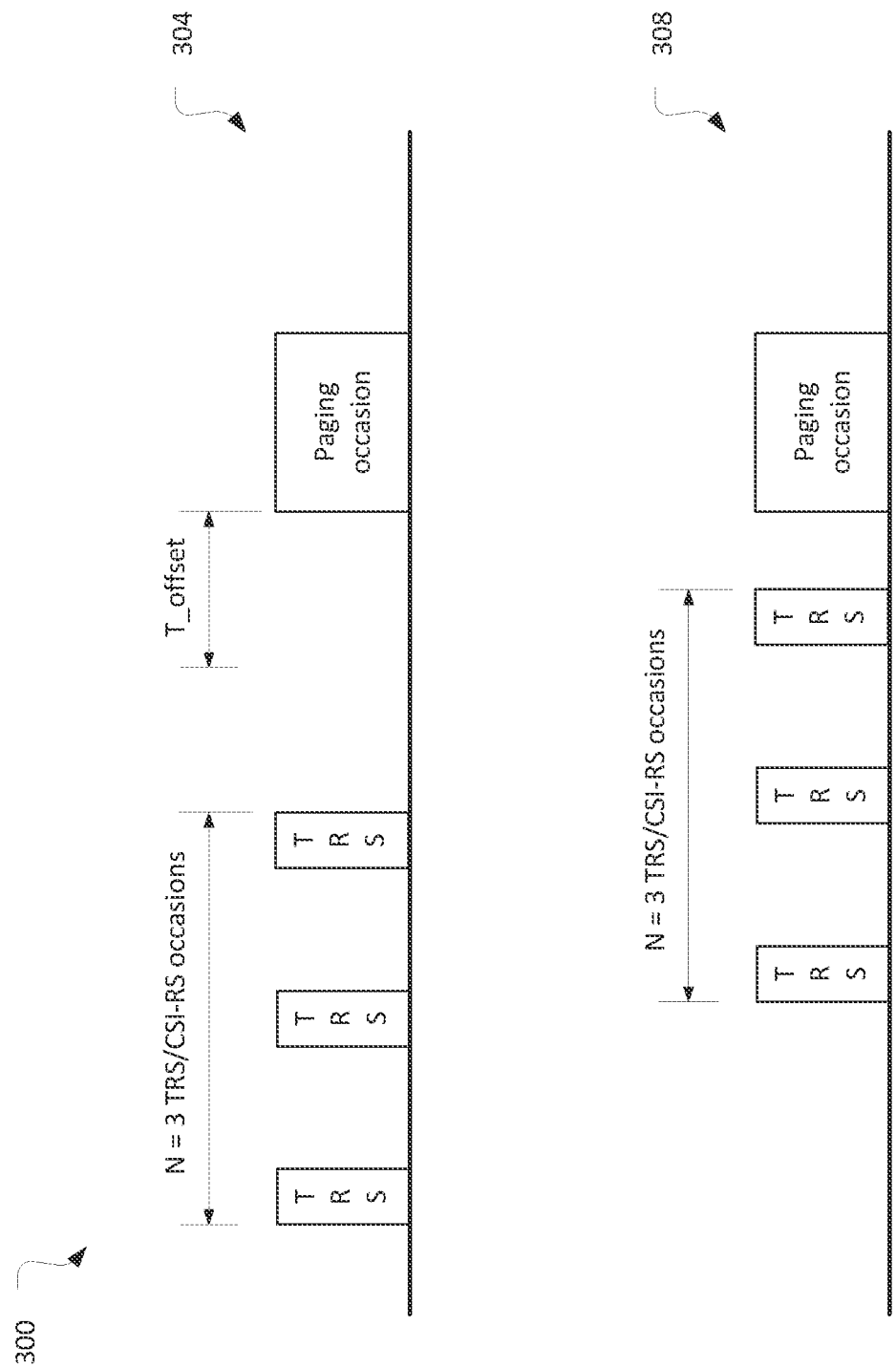
FIG. 3 illustrates other signaling diagrams in accordance with some aspects.

FIG. 3 illustrates signaling diagrams 300 in accordance with some aspects of the present disclosure. The signaling diagrams 300 include signaling diagram 304 and signaling diagram 308 that define the TRS/CSI-RS occasions that are to be transmitted based on a predetermined number (N).

Signaling diagram 304 illustrates that N TRS/CSI-RS occasions immediately before the start of a paging occasion minus an offset (T_offset) are to be transmitted. If N=1, the last TRS/CSI-RS occasion that occurs before the paging occasion minus the offset shall be transmitted when there is a paging PDCCH/PDSCH.

Signaling diagram 308 illustrates that N TRS/CSI-RS occasions immediately before the start of a paging occasion are to be transmitted. In this case, no offset is used (for example, T_offet=0).

The number (N), which is three in both signaling diagrams 304 and 308, may be a predetermined number that is predefined by, for example, a 3GPP TS, or may be configured by, for example, the base station 108.

Figure 4:
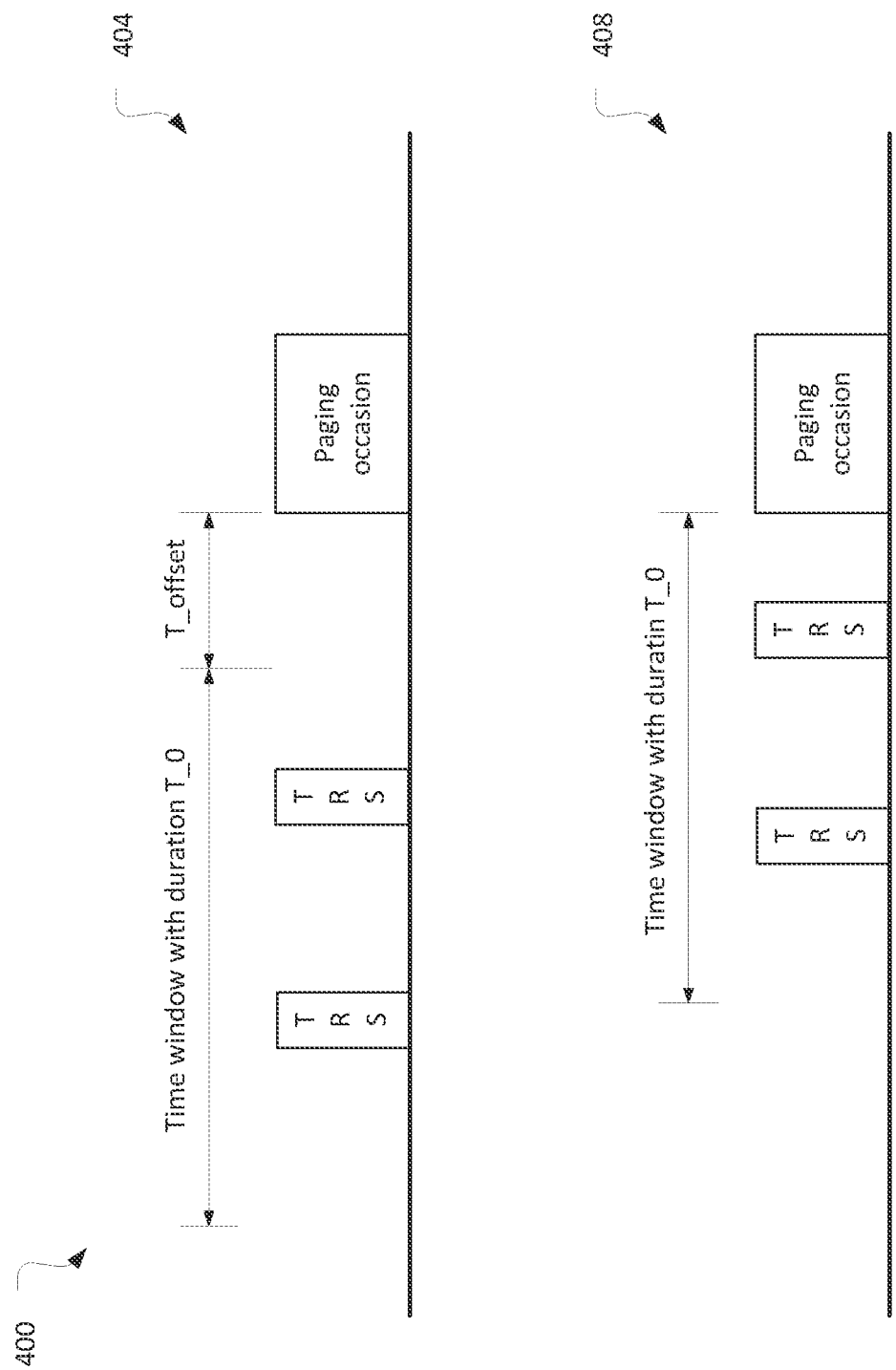
FIG. 4 illustrates other signaling diagrams in accordance with some aspects.

FIG. 4 illustrates signaling diagrams 400 in accordance with some aspects of the present disclosure. The signaling diagrams 400 include signaling diagram 404 and signaling diagram 408 that define the TRS/CSI-RS occasions that are to be transmitted based on a time window having a duration (T_0).

Signaling diagram 404 illustrates that TRS/CSI-RS occasions within a time window that ends an offset (T_offset) before the paging occasions are to be transmitted.

Signaling diagram 408 illustrates that TRS/CSI-RS occasions within a time window that ends immediately before the start of the paging occasions are to be transmitted. In this case, no offset is used (for example, T_offset=0).

The time window duration (T_0) may be a predetermined period of time (for example, 20 ms) or may be based on a periodicity of the TRS/CSI-RS configuration (for example, 2×period of the TRS/CSI-RS configuration). The time window duration (T_0) may be predefined by, for example, a 3GPP TS, or may be configured by, for example, the base station 108.

The offset (T_offset) used in signaling diagrams 300 or 400 may be predetermined in a manner similar to, or different from, the number (N) and the time window duration (T_0). For example, the offset may be predefined by a 3GPP TS or configured by the base station 108. In some embodiments, the offset, number, or time window duration may additionally/alternatively be based on a capability of the UE 104.

Figure 5:
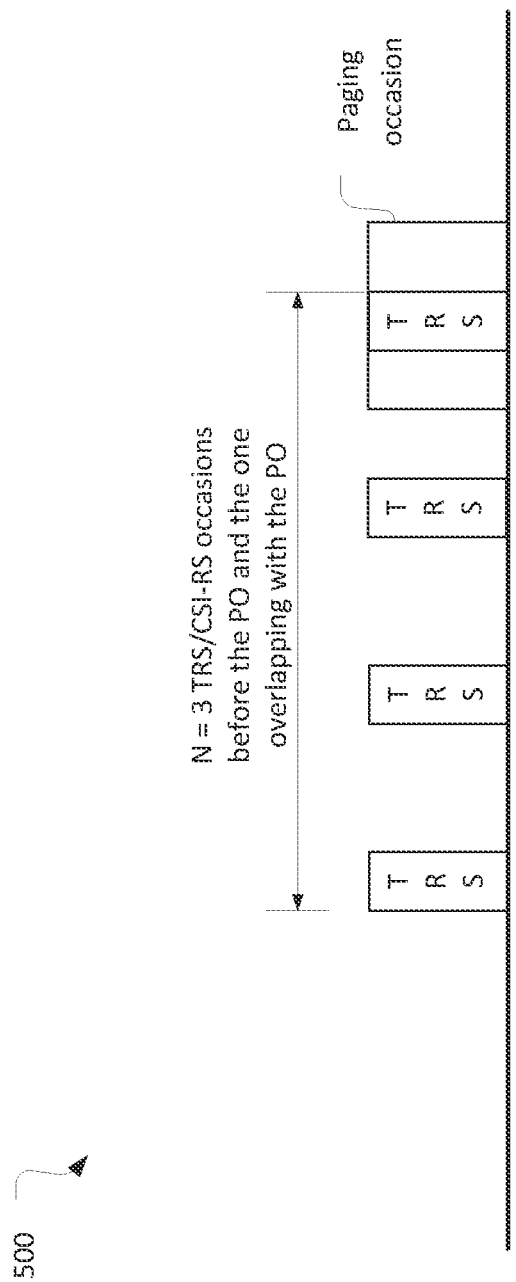
FIG. 5 illustrates another signaling diagram in accordance with some aspects.

While FIGS. 3 and 4 define the transmitted TRS/CSI-RS occasions as occurring before the paging occasion, some or all of the TRS/CSI-RS occasions may overlap with the paging occasion in other scenarios. FIG. 5 illustrates a signaling diagram 500 in accordance with some aspects.

Similar to signaling diagrams 300, the signaling diagram 500 may define the TRS/CSI-RS occasions that are to be transmitted based on a predetermined number (N). However, in this instance, N=3 may indicate that the three TRS/CSI-RS occasions before the paging occasion are to be used in addition with one or more TRS/CSI-RS occasions that overlap with the paging occasion. The overlapped TRS/CSI-RS occasions may still be potentially useful to the UE 104 for refining the time/frequency synchronization.

In some instances, the base station 108 may utilize a plurality of beams for transmitting downlink signals to various UEs within a cell. For example, as shown above with respect to FIG. 2, the different SSBs may correspond to different beams. The UE 104 may monitor a plurality of PDCCH monitoring occasions, corresponding to different beams, in a paging occasion, which may span across more than one slot. When the TRS/CSI-RS is configured, each TRS/CSI-RS configuration may be expected to be quasi co-located with one of the SSB beams. For example, the base station 108 may use the same beam to transmit the SSB and a corresponding TRS/CSI-RS.

When determining which TRS/CSI-RS occasions are to be transmitted if there is a paging PDCCH/PDSCH, additional enhancements may use the monitoring occasion that corresponds to the same SSB as the reference, instead of using the start of the paging occasion as discussed above with respect to FIGS. 3 and 4.

Figure 6:
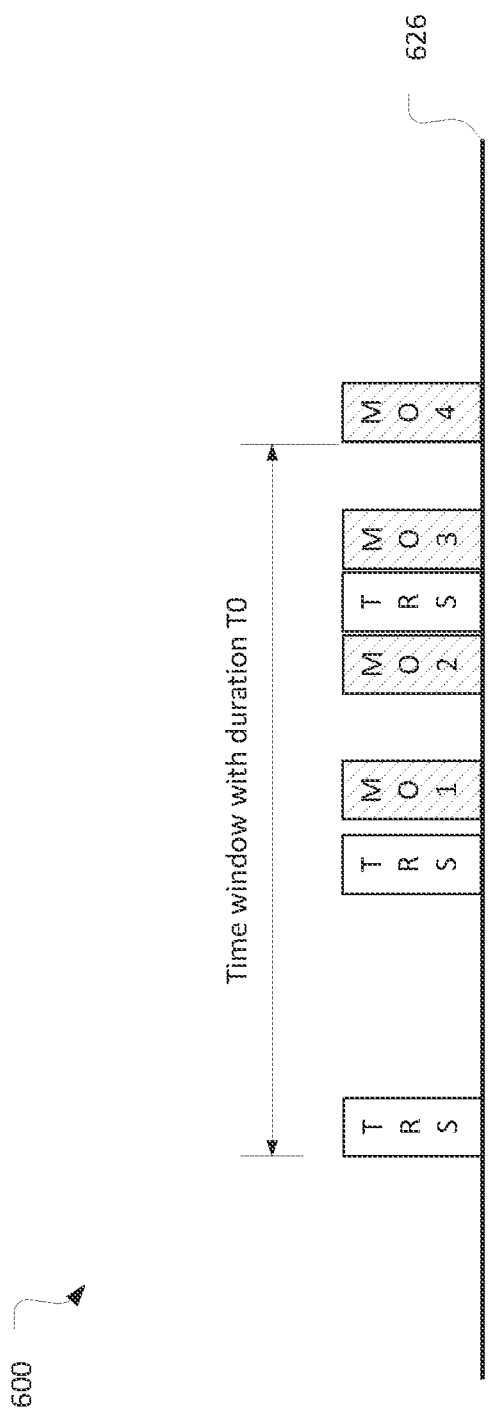
FIG. 6 illustrates another signaling diagram in accordance with some aspects.

FIG. 6 illustrates a signaling diagram 600 in which a determination of transmitted TRS/CSI-RS occasions is based on a specific monitoring occasion in accordance with some aspects of the present disclosure.

In this example, both the TRS/CSI-RS configuration and monitoring occasion 4 (MO4) may correspond to the same beamformed SSB. The TRS/CSI-RS may, therefore, be most useful for decoding a PDCCH/PDSCH using the same beam; for example, the PDCCH of MO4. Thus, in this instance, the UE 104 may use the MO4 as a reference to determine the transmitted TRS/CSI-RS occasions, rather than the start of the paging occasion or MO1. For example, the UE 104 may determine that the TRS/CSI-RS occasions within a time window with duration T_0 that end immediately before MO4 are to be transmitted.

While signaling diagram 600 corresponds to a method of determining the transmitted TRS/CSI-RS configurations using a time window with a T_offset=0, the beam-based operation may be equally applicable to determining the transmitted TRS/CSI-RS occasions in the other manners described herein. For example, the UE 104 may determine that N TRS/CSI-RS occasions before a corresponding MO, with or without a time offset, may be transmitted.

Figure 7:
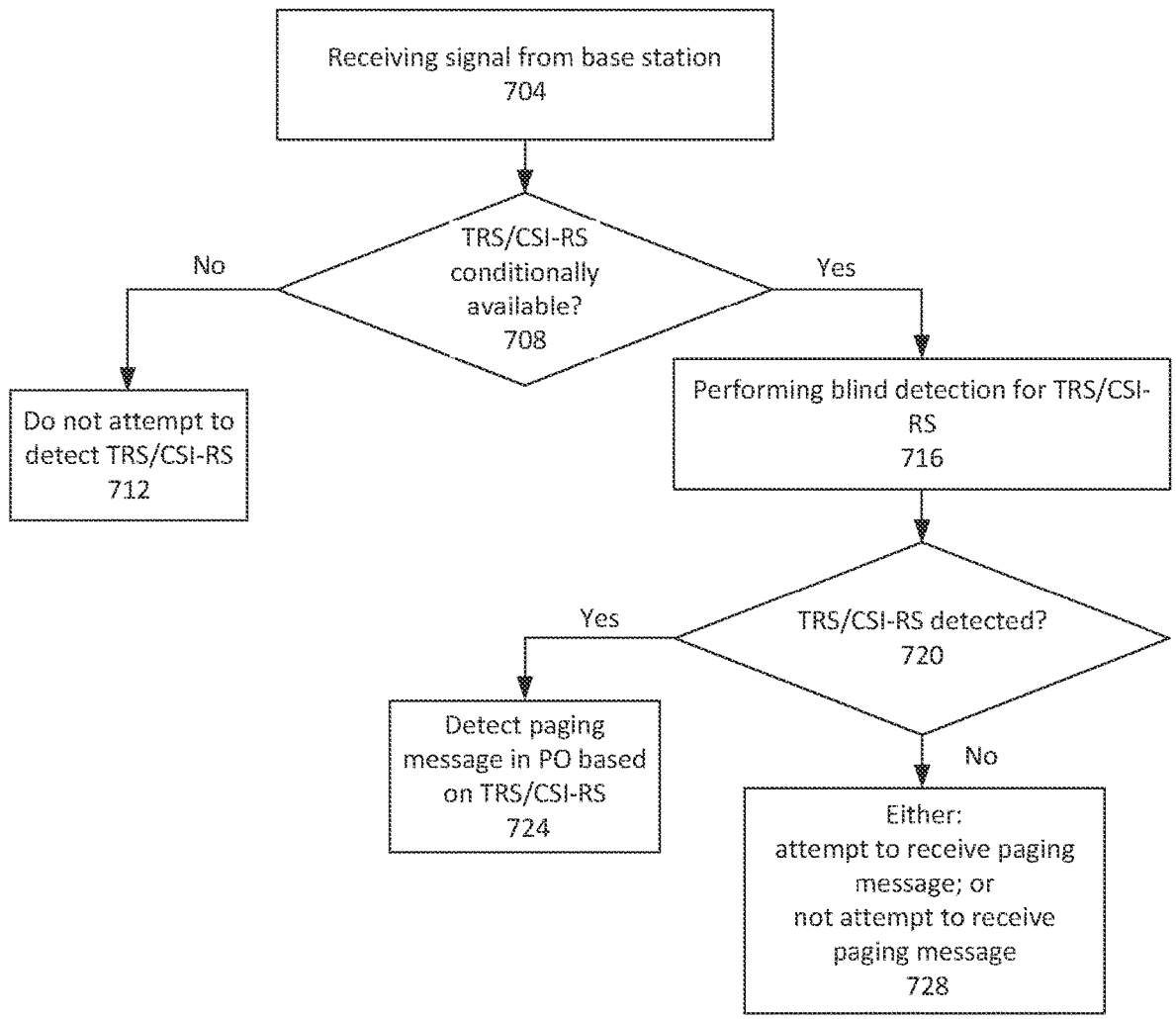
FIG. 7 illustrates an operational flow/algorithmic structure in accordance with some aspects.
Figure 8:
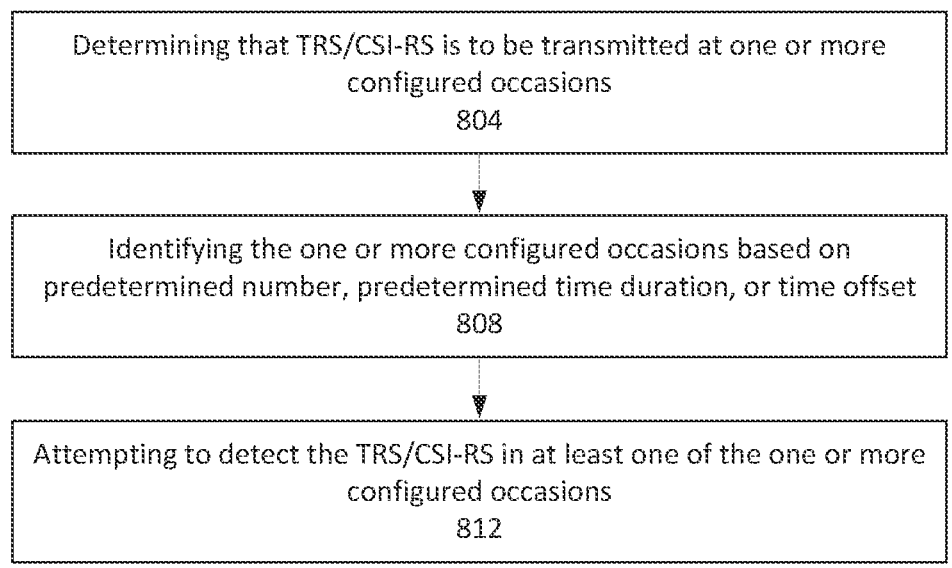
FIG. 8 illustrates another operational flow/algorithmic structure in accordance with some aspects.
Figure 9:
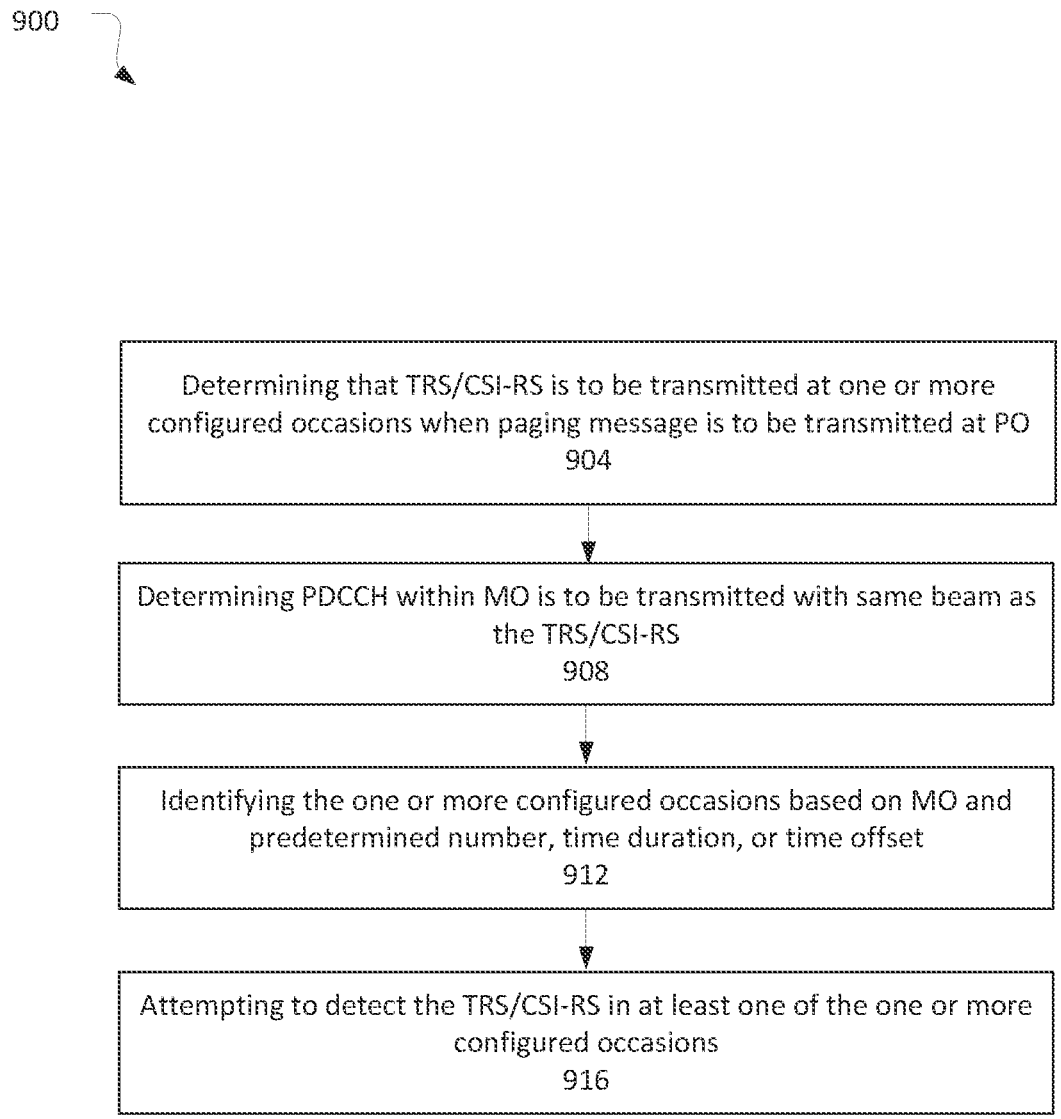
FIG. 9 illustrates another operational flow/algorithmic structure in accordance with some aspects.

FIGS. 7-9 present a number of operation flows/algorithmic structures in accordance with aspects of this disclosure. These operation flow/algorithmic structures describe a number of operations in a particular sequence. However, the presented sequences are not restrictive. That is, the operations may be performed in sequences other than those specifically presented.

FIG. 7 illustrates an operation flow/algorithmic structure 700 in accordance with some aspects. The operation flow/algorithmic structure 700 may be performed or implemented by a UE such as, for example, UE 104 or 1000, or components thereof; for example, baseband processor 1004A.

The operation flow/algorithmic structure 700 may include, at 704, receiving a signal from a base station. The signal may be a SIB, a PDCCH with a paging early indication, a paging PDCCH, or a paging PDSCH.

The operation flow/algorithmic structure 700 may further include, at 708, determining whether the TRS/CSI-RS is conditionally available. The determination at 708 may be based on the signal received at 704. If the signal is a SIB, the determination at 708 may be an implicit determination; for example, based on whether TRS/CSI-RS occasions are configured in the SIB, or an explicit determination, for example, a specific indication that indicates whether the configured TRS/CSI-RS occasions are conditionally available.

If it is determined at 708 that the TRS/CSI-RS occasions are not conditionally available, the operation flow/algorithmic structure 700 may advance to not attempting to detect the TRS/CSI-RS at block 712.

If it is determined at 708 that the TRS/CSI-RS occasions are conditionally available, the operation flow/algorithmic structure 700 may advance to performing a blind detection for TRS/CSI-RS at 716 and, subsequently, determining whether the TRS/CSI-RS is detected at block 720.

If the TRS/CSI-RS is detected at block 720, the operation flow/algorithmic structure 700 may advance to detecting a paging message in a paging occasion based on the TRS/CSI-RS at 724. For example, the UE may perform time/frequency synchronization based on a detected TRS/CSI-RS and may attempt to detect a PDCCH in the paging occasion using the updated time/frequency synchronization.

If the TRS/CSI-RS is not detected at block 720, the operation flow/agronomic structure 700 may advance to block 728.

At block 728, a UE may either attempt to receive a paging message or may not attempt to receive a paging message.

The UE may attempt to receive a paging message to account for a situation in which a TRS/CSI-RS was transmitted and not successfully detected by the UE. In some instances, the UE may have sufficient time/frequency synchronization without receiving the TRS/CSI-RS to still successfully receive a paging message.

Alternatively, the UE may not attempt to receive the paging message. This action may be based on an assumption that the failure to detect the TRS/CSI-RS at block 720 likely occurred because no TRS/CSI-RS was actually transmitted.

And, given that a TRS/CSI-RS is required to be transmitted when a paging messages transmitted, as indicated by the conditional availability determination at 708, the UE may determine that no paging message was transmitted.

FIG. 8 illustrates an operation flow/algorithmic structure 800 in accordance with some aspects. The operation flow/algorithmic structure 800 may be performed or implemented by a UE such as, for example, UE 104 or 1000, or components thereof; for example, baseband processor 1004A.

The operation flow/algorithmic structure 800 may include, at 804, determining that a TRS/CSI-RS is to be transmitted at one or more configured occasions. The determination at 804 may be based on the UE receiving signaling that indicates a TRS/CSI-RS is conditionally available.

The operation flow/algorithmic structure 800 may further include, at 808, identifying the one or more configured occasions based on a predetermined number, a time duration, or time offset. The predetermined number, time duration, or time offset may be used as described with respect to the signaling diagrams of FIGS. 3-6.

For example, the UE may determine that the TRS/CSI-RS is to be transmitted in the number of occasions that occur at least the time offset before the paging occasion (or before a specific monitoring occasion within the paging occasion).

For another example, the UE may determine that the TRS/CSI-RS is to be transmitted in occasions that occur in a window, having the time duration that ends at the time offset before the paging occasion (or before a specific monitoring occasion within the paging occasion).

In some instances, one or more of the configured occasions identified at 808 may overlap with the paging occasion.

The operation flow/algorithmic structure 812 may further include attempting to detect the TRS/CSI-RS in at least one of the one or more configured occasions. If the TRS/CSI-RS is detected, the UE may further refine its time/frequency synchronization to facilitate subsequent communication (for example, receipt of a paging PDCCH/PDSCH).

FIG. 9 illustrates an operation flow/algorithmic structure 900 in accordance with some aspects. The operation flow/algorithmic structure 900 may be performed or implemented by a UE such as, for example, UE 104 or 1000; or components thereof; for example, baseband processor 1004A.

The operation flow/algorithmic structure 900 may include, at 904, determining that a TRS/CSI-RS is to be transmitted at one or more configured occasions when a paging message is to be transmitted at a paging occasion. In some instances, the determination at 904 may be based on signaling from the base station that indicates the CSI-RS is conditionally available at the configured occasions. The signaling may be SIB or paging PDCCH/PDSCH as described herein.

The operation flow/algorithmic structure 900 may further include, at 908, determining a PDDCH within a monitoring occasion of the paging occasion is to be transmitted with the same beam as the TRS/CSI-RS. Determining the PDCCH and TRS/CSI-RS are transmitted by the same beam may be based on both the PDCCH and the TRS/CSI-RS having the same reference for beam indication. For example, if both the PDCCH and the TRS/CSI-RS correspond to the same beamformed SSB, they will be transmitted using the same beam.

The operation flow/algorithmic structure 900 may further include, at 912, identifying the one or more configured TRS/CSI-RS occasions based on the monitoring occasion and a predetermined number, time duration, or time offset. For example, the configured occasions may be identified as the number of occasions that occur at least the time offset before the monitoring occasion; or the occasions that occur within a window having the time duration that ends at the time offset before the monitoring occasion.

The operation flow/algorithmic structure 900 may further include, at 916, attempting to detect the TRS/CSI-RS in at least one of the one or more configured occasions. If the TRS/CSI-RS is detected, the UE may further refine its time/frequency synchronization to facilitate subsequent communication (for example, receipt of a paging PDCCH/PDSCH).

Figure 10:
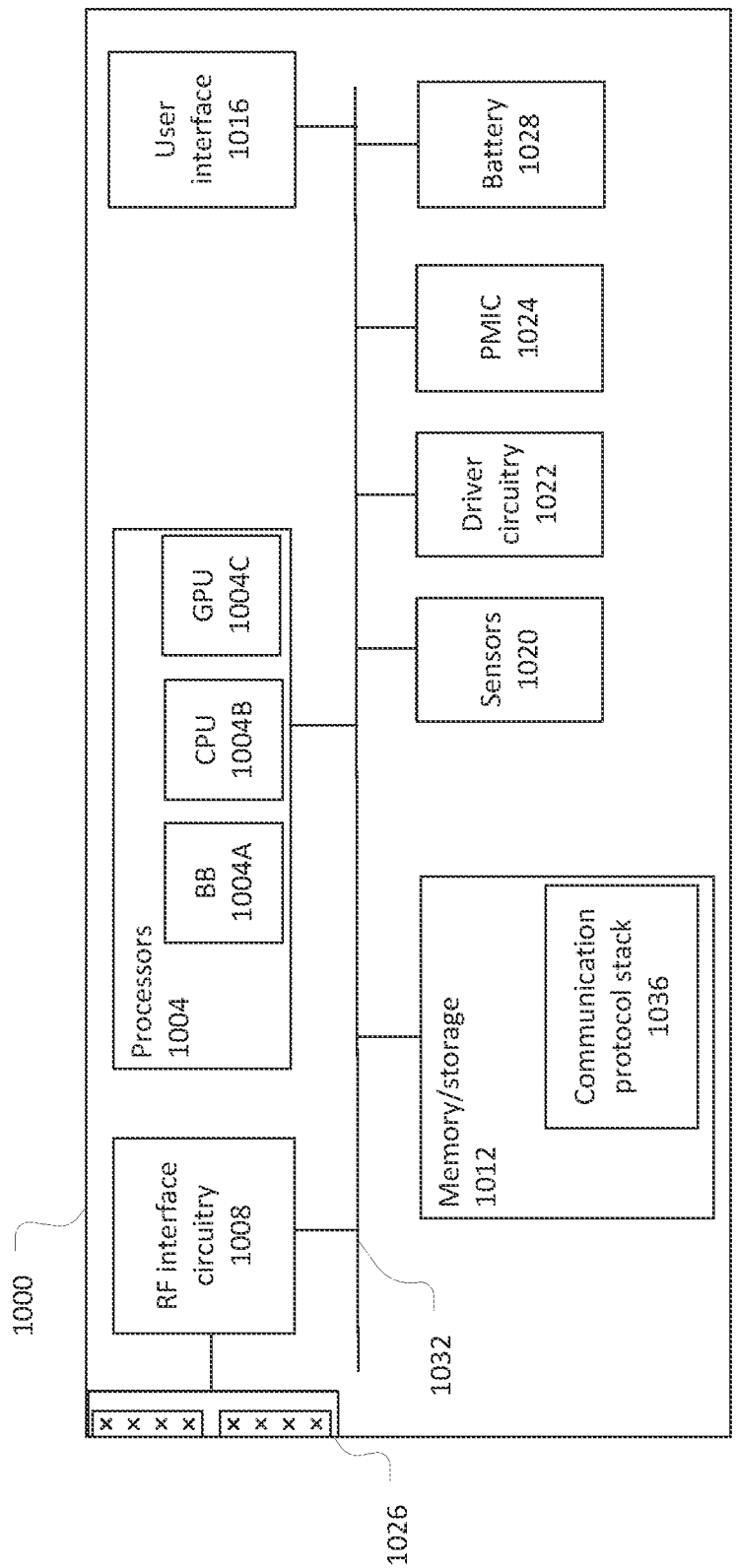
FIG. 10 illustrates a user equipment in accordance with some aspects.

FIG. 10 illustrates a UE 1000 in accordance with some aspects. The UE 1000 may be similar to and substantially interchangeable with UE 104.

The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices, proximity sensors, vehicle-based UEs, infrastructure-based UEs.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs); portions thereof; discrete electronic devices; or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some aspects, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some aspects, the PHY layer operations may additionally/alternatively be performed by the components of the RF interface circuitry 1008.

The baseband processor circuitry 1004A may generate or process baseband signals or waveforms that carry information in 3GPP-compatible networks. In some aspects, the waveforms for NR may be based on cyclic prefix OFDM (CP-OFDM) in the uplink or downlink, and discrete Fourier transform spread OFDM (DFT-S-OFDM) in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 may also store TRS/CSI-RS configuration as described elsewhere.

The memory/storage 1012 includes any type of volatile or non-volatile memory that may be distributed throughout the UE 1000. In some aspects, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory, such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various aspects, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple-input, multiple-output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in frequency ranges 1 and 2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators, such as light emitting diodes "LEDs" and multi-character visual outputs), or more complex outputs, such as display devices or touchscreens (for example, liquid crystal displays "LCDs," LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various input/output (110) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

A battery 1028 may power the UE 1000, although in some examples the UE 1000 may be mounted or deployed in a fixed location and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

Figure 11:
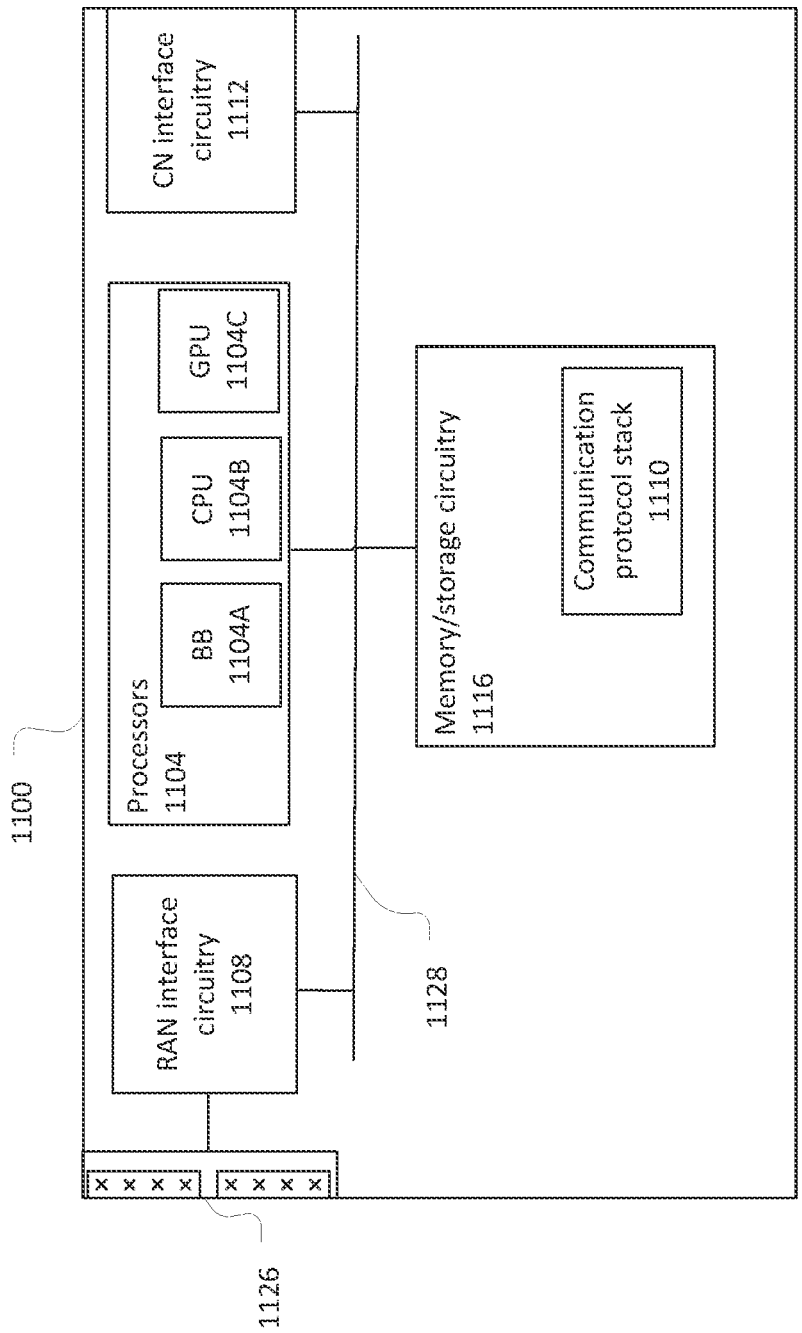
FIG. 11 illustrates a gNB in accordance with some aspects.

FIG. 11 illustrates a gNB 1100 in accordance with some aspects. The gNB node 1100 may be similar to and substantially interchangeable with base station 108.

The gNB 1100 may include processors 1104, RF interface circuitry 1108, core network (CN) interface circuitry 1112, memory/storage circuitry 1116, and antenna structure 1126.

The components of the gNB 1100 may be coupled with various other components over one or more interconnects 1128.

The processors 1104, RAN interface circuitry 1108, memory/storage circuitry 1116 (including communication protocol stack 1110), antenna structure 1126, and interconnects 1128 may be similar to like-named elements shown and described with respect to FIG. 10.

The CN interface circuitry 1112 may provide connectivity to a core network; for example, a $5^{th}$ Generation Core network (5GC) using a 5GC-compatible network interface protocol, such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

In some aspects, the gNB 1100 may be coupled with transmit receive points (TRPs) using the antenna structure 1126, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method of operating a UE, the method comprising: receiving a signal from a base station; determining, based on the signal, that a TRS/CSI-RS is conditionally available at a configured occasion; and attempting to detect the TRS/CSI-RS based on said determining.

Example 2 includes the method of example 1 or some other example herein, wherein the signal comprises a SIB and the method further comprises: receiving, in the SIB, information to configure the TRS/CSI-RS for transmission at the configured occasion; and determining that the TRS/CSI-RS is conditionally available based on said receiving of the information.

Example 3 includes the method of example 1 or some other example herein, wherein the signal comprises a SIB and the determining comprises: receiving, in the SIB, one or more bits to indicate that the TRS/CSI-RS is conditionally available.

Example 4 includes the method of example 1 or some other example herein, wherein the signal comprises a PDCCH or PDSCH transmission and the method further comprises: detecting, in the PDCCH or PDSCH transmission, an indication that the TRS/CSI-RS is conditionally available; and determining that the TRS/CSI-RS is to become conditionally available after a predetermined period of time.

Example 5 includes the method of example 4 or some other example herein, wherein the predetermined period of time is based on a configured parameter.

Example 6 includes the method of example 1 or some other example herein, wherein the signal comprises a paging early indication.

Example 7 includes the method of example 1 or some other example herein, wherein a condition upon which the TRS/CSI-RS is conditionally available at the configured occasion comprises a paging PDCCH being transmitted in a paging occasion that follows the configured occasion.

Example 8 includes the method of example 1 or some other example herein, wherein a condition upon which the TRS/CSI-RS is conditionally available at the configured occasion comprises a paging PDSCH being transmitted in a paging occasion that follows the configured occasion.

Example 9 includes the method of example 7 or 8 or some other example herein, further comprising: detecting the TRS/CSI-RS at the configured occasion; and receiving the paging PDCCH or PDSCH in the paging occasion.

Example 10 includes the method of example 7 or 8 or some other example herein, further comprising: failing to detect the TRS/CSI-RS at the configured occasion; and either attempting to receive the paging PDCCH or PDSCH in the paging occasion or not attempting to receive the paging PDCCH or PDSCH in the paging occasion.

Example 11 includes a method of operating a UE, the method comprising: determining that a TRS/CSI-RS is to be transmitted at one or more configured occasions of a plurality of configured occasions in the event a paging message is to be transmitted at a paging occasion; identifying the one or more configured occasions based on a predetermined number of occasions, a predetermined time duration, or a time offset; and attempting to detect the TRS/CSI-RS in at least one of the one or more configured occasions.

Example 12 includes the method of example 11 or some other example herein, wherein identifying the one or more configured occasions comprises identifying the one or more configured occasions based on a predetermined number of occasions that occur at least the time offset before the paging occasion.

Example 13 includes the method of example 11 or some other example herein, wherein identifying the one or more configured occasions comprises identifying the one or more configured occasions based on a predetermined number of occasions that occur immediately before the paging occasion.

Example 14 includes the method of example 11 or some other example herein, wherein identifying the one or more configured occasions comprises identifying the one or more configured occasions that occur within a time window that includes the predetermined time duration and ends at least the time offset before the paging occasion.

Example 15 includes the method of example 11 or some other example herein, wherein identifying the one or more configured occasions comprises identifying the one or more configured occasions that occur within a time window that includes the predetermined time duration and ends immediately before the paging occasion.

Example 16 includes the method of example 11 or some other example herein, wherein identifying the one or more configured occasions is based on the time offset, which is predefined or configured by the base station.

Example 17 includes the method of example 11 or some other example herein, wherein identifying the one or more configured occasions comprises identifying the one or more configured occasions as a predetermined number of occasions, wherein at least one of the one or more configured occasions overlaps, in a time domain, with the paging occasion.

Example 18 includes a method of operating a UE, the method comprising: determining that a TRS/CSI-RS is to be transmitted at one or more configured occasions when a paging message is to be transmitted at a paging occasion; determining a PDCCH within a monitoring occasion of the paging occasion is to be transmitted with a same beam as the TRS/CSI-RS; identifying the one or more configured occasions based on the monitoring occasion and a predetermined number of occasions, time duration, or time offset; and attempting to detect the TRS/CSI-RS in at least one of the one or more configured occasions.

Example 19 includes the method of example 18 or some other example herein, wherein determining the PDCCH is to be transmitted with the same beam as the TRS/CSI-RS comprises: determining that both the PDCCH and the TRS/CSI-RS correspond to a same SSB.

Example 20 includes the method of example 18 or some other example herein, wherein identifying the one or more configured occasions comprises identifying the one or more configured occasions based on a predetermined number of occasions that occur at least the time offset before the monitoring occasion.

Example 21 includes the method of example 18 or some other example herein, wherein identifying the one or more configured occasions comprises identifying the one or more configured occasions based on a predetermined number of occasions that occur immediately before the monitoring occasion.

Example 22 includes the method of example 18 or some other example herein, wherein identifying the one or more configured occasions comprises identifying the one or more configured occasions that occur within a time window that includes the predetermined time duration and ends at least the time offset before the monitoring occasion.

Example 23 includes the method of example 18 or some other example herein, wherein identifying the one or more configured occasions comprises identifying the one or more configured occasions that occur within a time window that includes the predetermined time duration and ends immediately before the monitoring occasion.

Example 24 includes the method of example 18 or some other example herein, wherein identifying the one or more configured occasions is based on the time offset, which is predefined or configured by the base station.

Example 25 includes a method of any one of examples 1-24, wherein the method is performed when the UE is in an RRC idle or inactive state.

Example 26 may include an apparatus comprising means to perform one or more elements of a method described in or related to any of examples 1-25, or any other method or process described herein.

Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 31 may include a signal as described in or related to any of examples 1-25, or portions or parts thereof.

Example 32 may include a datagram, information element, packet, frame, segment, PDU, or message as described in or related to any of examples 1-25, or portions or parts thereof, or otherwise described in the present disclosure.

Example 33 may include a signal encoded with data as described in or related to any of examples 1-25, or portions or parts thereof, or otherwise described in the present disclosure.

Example 34 may include a signal encoded with a datagram, IE, packet, frame, segment, PDU, or message as described in or related to any of examples 1-25, or portions or parts thereof, or otherwise described in the present disclosure.

Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 36 may include a computer program comprising instructions, wherein execution of the program by a processing element is to cause the processing element to carry out the method, techniques, or process as described in or related to any of examples 1-25, or portions thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above-described examples may be combined with any other example (or combination of examples), unless explicitly stated otherwise. The foregoing description of one or more implementations provides illustrations and descriptions, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   receiving a signal from a base station, wherein the signal is a physical downlink control channel (PDCCH) or physical downlink shared channel (PDSCH) transmission;
   detecting, in the PDCCH or PDSCH transmission, an indication that a tracking reference signal/channel state information-reference signal (TRS/CSI-RS) is conditionally available;
   determining, based on the indication, that the TRS/CSI-RS is conditionally available at a configured occasion after a predetermined period of time; and
   monitoring for the TRS or CSI-RS at the configured occasion.

2. The method of claim 1, wherein the predetermined period of time is based on a configured parameter.

3. The method of claim 1, wherein a condition upon which the TRS/CSI-RS is conditionally available at the configured occasion comprises a paging PDCCH PDSCH being transmitted in a paging occasion that follows the configured occasion.

4. The method of claim 3, further comprising:
   detecting the TRS/CSI-RS at the configured occasion; and
   receiving the paging PDCCH or PDSCH in the paging occasion.

5. The method of claim 3, further comprising:
   failing to detect the TRS/CSI-RS at the configured occasion; and
   either monitoring for the paging PDCCH or PDSCH in the paging occasion or not monitoring for the paging PDCCH or PDSCH in the paging occasion.

6. An apparatus comprising:
   processing circuitry to:
      determine that a tracking reference signal/channel state information-reference signal (TRS/CSI-RS) is to be transmitted at one or more configured occasions when a paging message is to be transmitted at a paging occasion;
      determine a physical downlink control channel (PDCCH) within a monitoring occasion of the paging occasion is to be transmitted with a same beam as the TRS/CSI-RS;
      identify the one or more configured occasions based on the monitoring occasion and a predetermined number of occasions, time duration, or time offset; and monitor for the TRS/CSI-RS in at least one of the one or more configured occasions; and interface circuitry coupled with the processing circuitry to enable communication.

7. The apparatus of claim 6, wherein to determine the PDCCH is to be transmitted with the same beam as the TRS/CSI-RS, the processing circuitry is to:

determine that both the PDCCH and the TRS/CSI-RS correspond to a same SSB.

8. The apparatus of claim 6, wherein the processing circuitry is to identify the one or more configured occasions based on a predetermined number of occasions that occur: at least the time offset before the monitoring occasion; or immediately before the monitoring occasion.

9. The apparatus of claim 6, wherein to identify the one or more configured occasions the processing circuitry is to identify the one or more configured occasions that occur within a time window that includes a predetermined time duration and ends at least the time offset before the monitoring occasion.

10. The apparatus of claim 6, wherein the processing circuitry is to identify the one or more configured occasions that occur within a time window that includes a predetermined time duration and ends immediately before the monitoring occasion.

11. The apparatus of claim 6, wherein the processing circuitry is to identify the one or more configured occasions based on the time offset, which is predefined or configured by a base station.

12. The apparatus of claim 6, wherein the processing circuitry is to identify the one or more configured occasions when a user equipment is in a radio resource control (RRC) idle or inactive state.

13. One or more non-transitory, computer-readable media having instructions that, when executed, cause processor circuitry to:

generate a signal to be transmitted to a user equipment (UE), wherein the signal is a physical downlink control channel (PDCCH) or physical downlink shared channel (PDSCH) transmission with an indication that a tracking reference signal/channel state information-reference signal (TRS/CSI-RS) is conditionally available at a configured occasion after a predetermined period of time;

determine a paging message is to be transmitted to the UE after the configured occasion; and generate, based on determination that the paging message is to be transmitted to the UE, the TRS/CSI-RS to be transmitted to the UE at the configured occasion.

14. The one or more non-transitory, computer-readable media of claim 13, wherein the instructions, when executed, further cause the processor circuitry to:

generate, for transmission to the UE, a parameter to configure the UE with the predetermined period of time.

* * * * *